Jan. 13, 1970   H. MIES   3,488,786
METHOD OF MAKING SHOE INSOLES
Filed Oct. 17, 1968   3 Sheets-Sheet 1

INVENTOR.
Heinz Mies

BY: Kelman and Berman
AGENTS

Jan. 13, 1970 H. MIES 3,488,786
METHOD OF MAKING SHOE INSOLES
Filed Oct. 17, 1968 3 Sheets-Sheet 3

INVENTOR.
Heinz Mies

BY: Kilman and Berman
AGENTS

United States Patent Office 3,488,786
Patented Jan. 13, 1970

3,488,786
METHOD OF MAKING SHOE INSOLES
Heinz Mies, Pirmasens, Germany, assignor to Dr. Rudolf Schieber Industrie-Unternehmunger KG., Bopfingen, Germany
Filed Oct. 17, 1968, Ser. No. 768,349
Claims priority, application Germany, Oct. 18, 1967, 1,685,747
Int. Cl. A43d *21/00, 23/00*
U.S. Cl. 12—146                  6 Claims

ABSTRACT OF THE DISCLOSURE

A method for the production of insoles with a hidden strip spring stiffening the ankle portion, in which after stamping out the insole from single or multi-layer material, a cutting tool, such as a rotating bell-shaped bit, is used to gouge a sliver or tongue along the ankle part of the shoe insole and after placing the stiffening strip under the sliver, the latter is stuck down in a suitably shaped press so that the edges of the sliver overlap the strip.

---

The present invention relates to methods for the production of shoe insoles with a stiffened ankle portion.

One prior art method of producing such insoles comprises milling a groove in the undersurface of the insole, and then rivetting a steel strip spring in the groove. In the case of multi-layer insoles such steel strip springs can be embedded between two adjacent layers of the insole. This can be carried out, for instance, by firstly rivetting the strip to the upper side of the lower layer which is used for forming the insole and may consist, for instance, of thick cardboard, and then bonding the lower layer to the lower surface of the upper layer, consisting for example of leather fiber material, of the insole. The two layers are then pressed together in accordance with their final shape.

A disadvantage of this known method is the comparatively large number of working steps required, that is to say punching or stamping out the main part of the insole, punching out the additional ankle part of the insole, rivetting the steel strip spring with the ankle part, bonding these parts to the main part of the insole, pressing the insole as made up of these parts in a press with suitably shaped pressing surfaces, and chamfering the ankle part of the insole. There is the additional disadvantage that the chamfering cannot be carried out neatly because both parts of the insole are very often displaced in an edgewise direction after the positioning of the steel spring strip. Even with a slight edgewise displacement it is found that a step is formed at the lateral chamfered part of the insole.

In order to overcome such step formation, a further method has been previously proposed in which the lower layer, made for instance of cardboard, of the ankle part of the insole should be stuck or otherwise attached at its leading edge to the leather fiber material before the main insole part is punched out. After such attachment the insole is cut out by punching from the composite material and the lower layer consisting of cardboard is bent downwards for rivetting to it of the steel strip. Adhesive is then applied and the lower part or layer is bent back upwards and pressed into place using a press with suitably shaped pressing faces so as to produce an adhesive bond. The following final step is the chamfering of the ankle portion of the insole.

One object of the present invention is to overcome the disadvantages of these prior art methods.

The present invention consists in a method for the production of a shoe insole with an ankle portion stiffened by means of a resilient metal strip, comprising the steps of cutting an insole from sheet material, cutting a sliver from the insole so as to leave a groove under the sliver, the sliver and corresponding groove extending along the angle portion of the insole and having a width and length greater than the metal strip, applying adhesive, placing the metal strip in the groove, placing the insole in a press with pressing faces corresponding to the desired shape of the insole, and using the press to press surfaces of the sliver which overlap the metal strip against corresponding surfaces in the groove to make and adhesive bond between the surfaces.

The method can be applied both to single layer and to multi-layer insoles.

In accordance with a preferred feature of the invention the sliver or tongue is cut by producing relative movement between a cutting tool and the insole corresponding to movement of the tool along the ankle part of the insole in order to cut out the sliver lengthwise while leaving a sufficient thickness of insole material underneath the sliver. In the case of multi-layer insoles, the first step is the cutting out from multi-layer strip material whose layers are bonded together by an adhesive over their whole surfaces before the sliver is cut.

In accordance with a further preferred feature of the invention, the tool used for cutting is rotated so as to produce a groove and corresponding sliver surface which are part-cylindrical. Preferably the sliver is left attached at one end to the rest of the insole.

Although it is generally preferred to cut the sliver on the top of the insole, it is also possible to cut it from the underneath surface portion.

The advantages of the method in accordance with the invention primarily reside in simplification and cheapening of production. Irrespective of whether it is of a single or multi-layer construction, the insole can be punched from strip material so that chamfering of the ankle portion can be later carried out without any difficulties owing to edge wise misalignment of the layers being excluded. The rivetting of the steel insert or strip spring can be dispensed with. As compared with insoles in which the steel strip spring is enclosed in a milled groove, there is the advantage that there is substantially no weakening of the material of the insole. There is the advantage over known insoles in which the steel strip spring is arranged between two layers, that not only is there no rivetting or danger of lateral misalignment of the layers, but also there is the advantage that the sticking together of the layers does not take place in the press after the introduction of the steel strip spring. It has been found namely that when adhesive bonding is carried out in such a press having curved surfaces, a misalignment of the layer is often brought about which impairs proper chamfering of the ankle portion using a milling cutter. Finally the invention enables the steel strip spring to be hidden in insoles of a single piece of material, for instance leather, leather fiber material or cardboard.

Embodiments of the method in accordance with the invention are now described with reference to the accompanying drawings.

Figure 1:
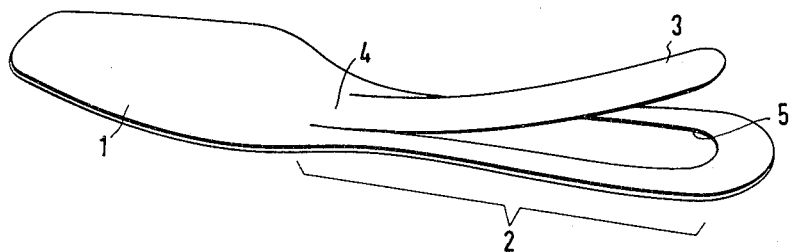
FIGURES 1, 2 and 3 show successive stages in the first method in accordance with the invention.
Figure 2:
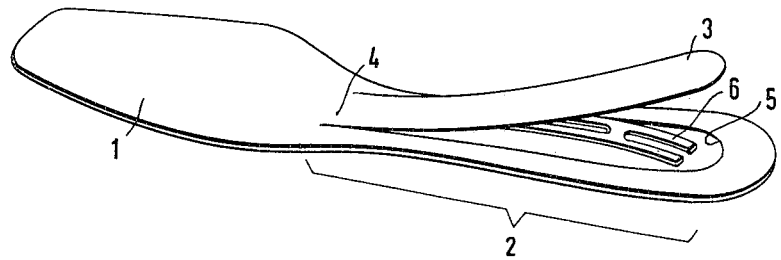
Figure 3:
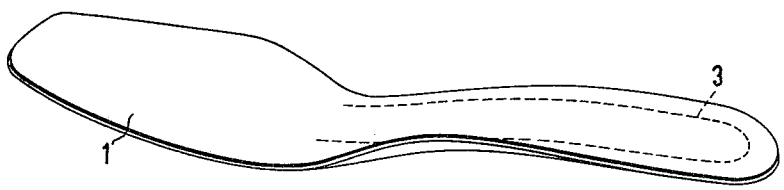

Referring now to FIGURES 1, 2 and 3, it will be seen that FIGURE 1 shows a punched or stamped out single layer insole 1 of leather fiber material with a sliver or tongue 3 gouged out of the upper part of the ankle part 2. The fore end 4 is left attached to the material of the insole 1. Owing to the gouging out of the sliver 3, for instance by means of a rotating bell-shaped cutter, a shallow groove or recess 5 is left in the insole.

The next step in the method is shown in FIGURE 2 in which a curved spring strip 6, serving for stiffening and reinforcement of the ankle part 2, has been inserted into the groove 5 under the sliver 3 which has been bent upwards.

Finally, as shown in FIGURE 3, after the application of adhesive to the cut surfaces of the sliver and the groove, the sliver 3 is bent back downwards so as to overlap and cover the strip 6. The marginal overlapping portion of the sliver is bonded to the rest of the insole, the insole being caused to take on its final desired shape by passing in a press with suitably shaped pressing faces. In the condition shown in FIGURE 3 the edge of the insole is chamfered by a milling cutter.

Figure 4:
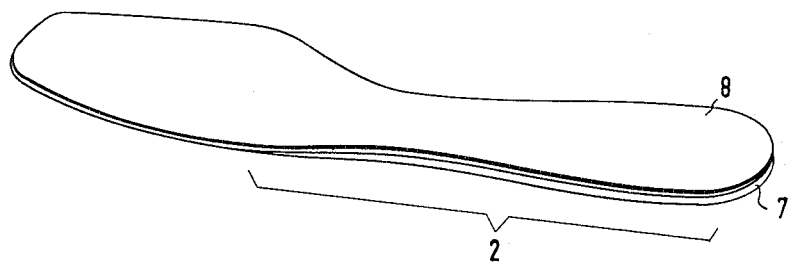
FIGURES 4, 5, 6 and 7 show successive stages in a second embodiment of the invention.
Figure 5:
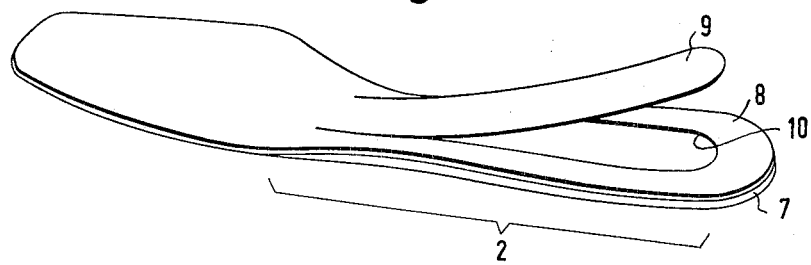
Figure 6:
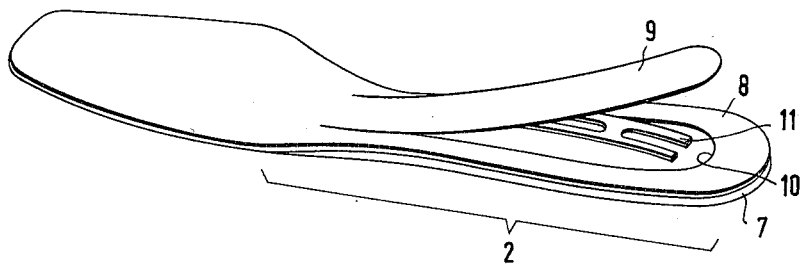

In the embodiment of the invention shown in FIGURES 4 to 6, a double-layer insole is punched from a strip which consists of a relatively broad strip of leather fiber material and a narrower layer of cardboard. The cardboard layer is bonded over its whole surface to the leather fiber layer. Reference numeral 7 denotes a reinforcing cardboard layer or part which is attached to the rest of the insole 8 along its ankle part 2.

FIGURE 5 shows the same insole after a thin sliver 9 has been gouged out of the insole 8 along the ankle part 2. The depth of the groove 10 produced by the gouging extends as far as the cardboard part 7.

FIGURE 6 shows the insole in accordance with FIGURE 5 after the insertion of the steel spring strip 11 under the sliver or tongue 9.

Figure 7:
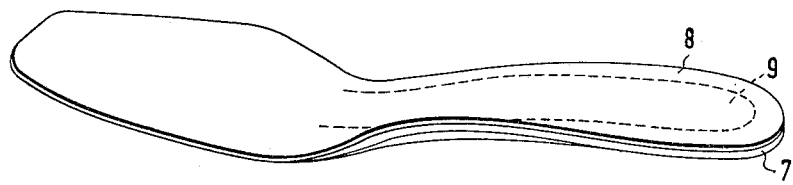

FIGURE 7 shows the insole 7, 8 after the bonding of the sliver 9 in position and the pressing of the sole in a shaping press so as to give the insole its final shape.

In accordance with a modification of the method of production shown in FIGURES 4 to 7, the sliver can be cut from the lower surface part of the reinforcing part 7 and the strip spring made of steel laid under the sliver. The sliver is then stuck back on to the remainder of the sole so that its edge portions are aligned with the surrounding surface from which is was originally cut.

Figure 8:
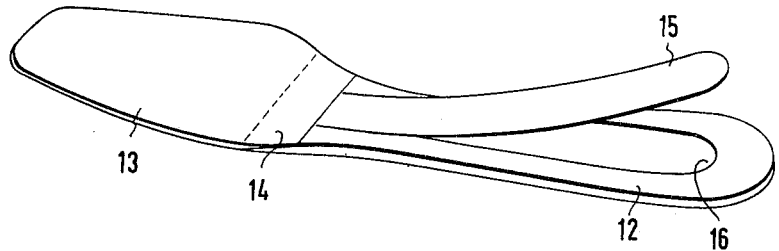
FIGURE 8 shows a stage in a third embodiment of the invention.

In accordance with the embodiment of the invention shown in FIGURE 8 an insole with an ankle part 12 consists of a layer of thick cardboard and a fore-part 13 of a layer of leather fiber material. Before punching out both parts are stuck together by means of adhesive at a position adjacent to a chamfered or tapering edge part 14. The sliver 15 is cut out of the upper surface part of the ankle part 12, as was the case with the single layer insole shown in FIGURES 1 and 3. The support spring strip is inserted in a similar manner into the groove 16 under the sliver before sticking down the sliver. The sticking or bonding is carried out during the course of a pressing operation which gives the insole its final shape, the insole taking on the shape of the spring strip during this production step.

FIGURES 1 to 3 and 8, which show the application of the method to single layer insoles, make clearly apparent the advantage which is obtained by substantial avoidance of any weakening of the material of the insole.

FIGURES 4 to 7, which show the application of the method in the case of an insole, which, at least in the ankle part, is of a two-layer construction, make clearly apparent the advantage due to the fact that the two layers of the insole are firmly bonded together before punching out.

The adhesive may be applied by placing a film with adhesive on both sides under the sliver.

What I claim is:

1. A method for the production of a shoe insole with an ankle portion stiffened by means of a resilient metal strip, comprising the steps of cutting an insole from sheet material, cutting a sliver from the insole so as to leave a groove under the sliver, the sliver and corresponding groove extending along the ankle portion of the insole and having a width and length greater than the metal strip, applying adhesive, placing the metal strip in the groove, placing the insole in a press with pressing faces corresponding to the desired shape of the insole, and using the press to press surfaces of the sliver which overlap the metal strip against corresponding surfaces in the groove to make an adhesive bond between the surfaces.

2. A method in accordance with claim 1 comprising the step of producing relative movement between a cutting tool and the insole corresponding to movement of the tool along the ankle part of the insole in order to cut out the sliver lengthwise.

3. A method in accordance with claim 2 comprising the step of rotating the tool to produce groove and corresponding sliver surfaces which are part-cylindrical.

4. A method in accordance with claim 1 in which the sliver is left attached at one end to the rest of the insole.

5. A method in accordance with claim 1 in which filmlike adhesive means is placed between the sliver and the rest of the insole before pressing.

6. A method in accordance with claim 1 in which the insole has at least two layers which are bonded together by an adhesive over their whole surfaces before the sliver is cut.

References Cited

UNITED STATES PATENTS

| | | | |
|---|---|---|---|
| 1,237,152 | 8/1917 | Bartels | 12—146 |
| 2,221,860 | 11/1940 | Bray | 12—146 X |
| 2,237,783 | 4/1941 | Hummel | 12—146 X |

PATRICK D. LAWSON, Primary Examiner